US012782880B2

(12) United States Patent
Jeffs

(10) Patent No.: US 12,782,880 B2
(45) Date of Patent: Nov. 3, 2026

(54) RACING TACHYMETER

(71) Applicant: BROOKLANDS WATCH CO., London (GB)

(72) Inventor: Simon Charles Jeffs, Fingest (GB)

(73) Assignee: BROOKLANDS WATCH CO., London (GB)

( * ) Notice: Subject to any disclaimer, the term of this patent is extended or adjusted under 35 U.S.C. 154(b) by 140 days.

(21) Appl. No.: 18/862,893

(22) PCT Filed: Mar. 14, 2023

(86) PCT No.: PCT/EP2023/056481
§ 371 (c)(1),
(2) Date: Nov. 4, 2024

(87) PCT Pub. No.: WO2023/213467
PCT Pub. Date: Nov. 9, 2023

(65) Prior Publication Data

US 2025/0291319 A1 Sep. 18, 2025

(30) Foreign Application Priority Data

May 6, 2022 (CH) ............................... 000530/2022

(51) Int. Cl.
*G04F 8/00* (2006.01)
*G01P 3/66* (2006.01)
(Continued)

(52) U.S. Cl.
CPC ................ *G04F 8/006* (2013.01); *G01P 3/66* (2013.01); *G04B 19/18* (2013.01); *G04B 47/046* (2013.01); *G04B 47/061* (2013.01)

(58) Field of Classification Search
CPC G04F 8/006; G04F 7/06; G04B 19/18; G04B 47/046; G04B 47/061; G04B 19/16; G04B 19/166
(Continued)

(56) References Cited

U.S. PATENT DOCUMENTS 347,337 A * 8/1886 Ethridge ................ G04B 19/16 368/231
1,508,644 A * 9/1924 Cassel ..................... G01P 1/122 346/21
(Continued)

OTHER PUBLICATIONS

Tachymeters—https://tachymeters.com/—Jul. 10, 2026.*
(Continued)

*Primary Examiner* — Sean Kayes
(74) *Attorney, Agent, or Firm* — Maschoff Brennan

(57) ABSTRACT

A tachymeter device for indicating an average speed of a moving object and a wristwatch comprising such a tachymeter device comprising a timer and an activator for manually starting the timer when the object passes a starting mark and for stopping the timer when the object passes a defined distance from the starting mark. The tachymeter device may further comprise a housing, a scale for indicating an average speed of the moving object, and a pointer for indicating a measured average speed on the scale. The scale may be designed as a scale part that is arranged detachably at the housing. The scale part may be selected from a set of scale parts comprising differing scale parts each having a scale with speed indication for indicating speed ranges corresponding to differing pre-defined distances.

20 Claims, 3 Drawing Sheets

Figure 1:
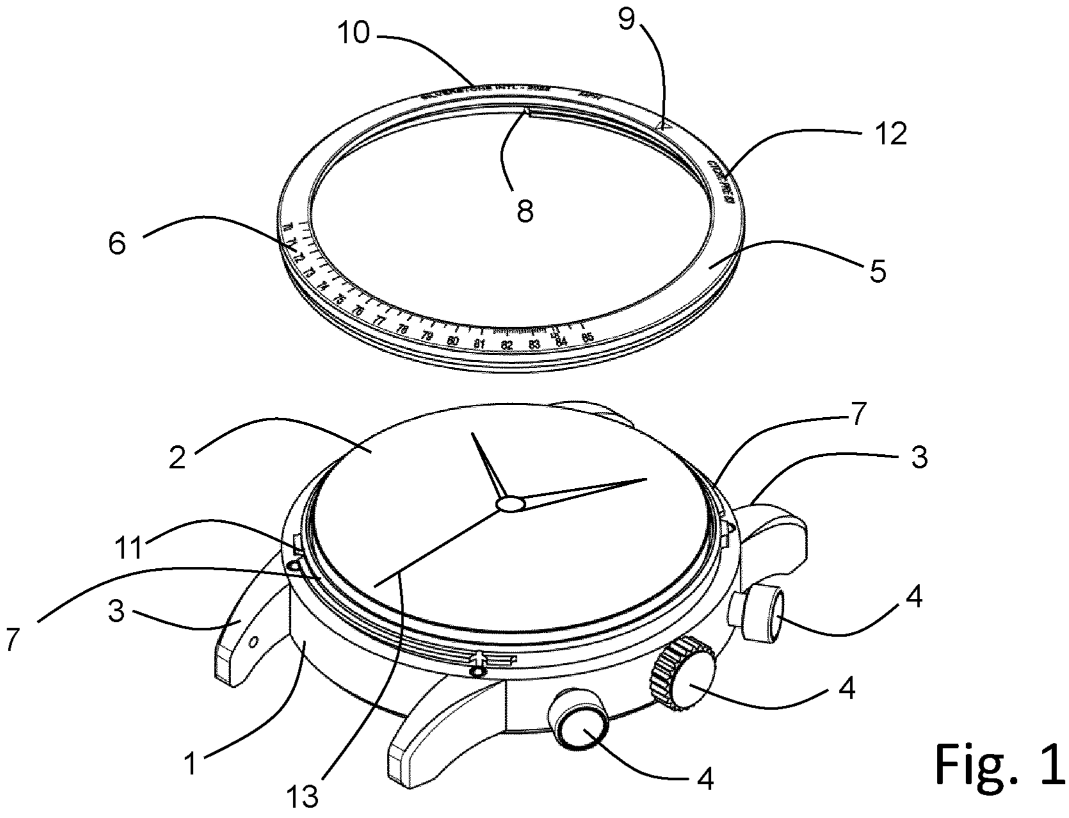

(51) Int. Cl.
*G04B 19/18* (2006.01)
*G04B 47/04* (2006.01)
*G04B 47/06* (2006.01)

(58) Field of Classification Search
USPC .......................................... 368/231; 116/280
See application file for complete search history.

(56) References Cited

U.S. PATENT DOCUMENTS

| | | | | | |
|---|---|---|---|---|---|
| 2,103,606 | A * | 12/1937 | Abrahamsohn | ........ | G01D 13/10<br>116/DIG. 3 |
| 3,557,547 | A * | 1/1971 | Rejminger | ................ | G04F 7/06<br>368/232 |
| 5,111,439 | A * | 5/1992 | Erard | ................... | G04B 19/266<br>368/19 |
| 2006/0114753 | A1 * | 6/2006 | Gerber | ................. | G04B 19/283<br>368/295 |
| 2009/0122654 | A1 * | 5/2009 | Behling | ............... | G04B 47/042<br>368/89 |
| 2018/0368541 | A1 * | 12/2018 | Burr | ..................... | A44C 25/002 |
| 2019/0187619 | A1 * | 6/2019 | Wahler | ............... | G04B 37/0041 |

OTHER PUBLICATIONS

How to use—https://www.wikihow.com/Use-a-Tachymeter Jul. 10, 2026.*

Interchaeable bezel kits—https://nivadagrenchenofficial.com/pages/interchangeable-bezel Jan. 24, 2025.*

Gear patrol—https://www.gearpatrol.com/watches/nivada-grenchen-chronomaster-interchangeable-bezel/—Dec. 17, 2024.*

* cited by examiner

RACING TACHYMETER

The present invention relates to a tachymeter device comprising a speed scale and a pointer movable along the speed scale to indicate a speed of a moving object, such as a motor vehicle or boat, according to the preamble of patent claim 1. Particularly, the present invention relates to a racing tachymeter device for racing cars.

Stopwatches and timepieces with a tachymeter function are used to measure and indicate the average speed of moving objects like cars, motor bikes or boats based on a distance covered over a time interval. They comprise a scale indicating speed units, for example in kilometers, miles or nautical miles per hour. The stopwatch is started when the moving object passes a start marker and is stopped at a second marker once a known distance had been covered by the moving object. A pointer indicates the resulting average speed on the scale. Further, it is difficult to identify when the car has reached the defined distance away from the start mark. So the stopping of the timer can be unprecise and causes flaws in the speed indication.

It is known to provide tachymeter devices on wristwatches. For example, the document DE 10 2007 005 592 A1 discloses a wristwatch that comprises circular speed scales displayed on a bezel of the watch. A first speed scale includes three concentric rows of speed units to cover a speed range between 125 km/h and 178 km/h used to indicate a speed on a racing course. A second speed scale, arranged concentrically inside the first scale, covers a speed range between 140 km/h und 260 km/h indicating a speed on a test course. A pushbutton is used to start a timer when a car passes a start mark and to stop the timer when a second marker located at a defined distance after the start mark is reached by the car. A finger rotating around the center axis of the scales indicates the average speed of the object on the first and the second scale. A third scale is located inside the two average speed scales for indicating which of the three concentric rows of the first speed scale has to be used to read the average speed. As a result the watch-face of this wristwatch is cluttered with indications that are hard to read and difficult to be distinguished. Speed reads derived from this wristwatch can easily be inaccurate.

It is an object of the present invention to provide a tachymeter device that reliably reflects the average speed of a moving object, covers a wide range of speed indications, covers a wide range of defined distances, facilitates accurate speed readings, allows for a simple handling of the device and provides an instant average speed reading for various defined distances.

These and other objects are fulfilled by a tachymeter device according to independent claim 1 and a wristwatch according to independent claims 10. Advantageous features and preferred embodiments of the tachymeter device and the wristwatch according to the invention are disclosed in dependent claims 2 to 9.

According to the present invention a tachymeter device for indicating an average speed of a moving object comprises a timer and an activator for manually starting the timer, when the object passes a starting mark and stopping the timer, when the object passes a defined distance from the starting mark. The timer measures the time that the moving object needs to cover the defined distance. Further, the tachymeter device comprises a housing, a scale on the housing for indicating an average speed of the moving object and a pointer for indicating a measured average speed on the scale, wherein the measured average speed is derived from the defined distance and a time needed by the moving object to cover said defined distance measured by the timer. The scale on the housing of the tachymeter device according to the present invention is designed as a scale part that is arranged detachably at the housing. Further, the scale part is selected from a set of scale parts comprising a plurality of differing scale parts each having a scale with speed indication units for indicating speed ranges corresponding to differing pre-defined distances. The set of scale parts is provided with the tachymeter device. A user of the device can choose the scale part that corresponds to the pre-defined distance to be covered by the moving object.

The tachymeter device according to the invention can be easily adapted for measuring an average speed on a variety of different pre-defined distances. A scale part corresponding to a pre-defined distance can simply be detached from the housing and another scale part corresponding to another pre-defined distance can be attached at the housing. This way the tachymeter device can for example be used for different racing courses for cars or motor bikes, for different regatta courses of boats or for different race courses of horse races. Advantageously, the speed indication units on each of the scale parts cover typical average speed values for each of the differing pre-defined distances for a specific moving object. Also, the distancing of the speed indication units from each other can be adjusted such that the extension of the scale matches the size of the scale part and there are no overlapping speed indication units. This way the measured average speed can be easily and accurately read on the scale part.

Therefore, in one embodiment of the tachymeter device of the present invention each of the scale parts of the set of scale parts can correspond to a known track defining a different pre-defined distance for each of the different scale parts and the speed indication units on a scale part for a pre-defined track cover a range of typical average speeds of a moving object for said pre-defined track. Preferably, the distancing of the speed indication units on the scale part is selected such that the scale covers only one row of indication units to keep the scale uncluttered and easy to read.

In a preferred embodiment of the tachymeter device the speed indication units on the scale part for said pre-defined track range from an average speed of a slowest moving object on said track to the average speed of a fastest moving object on said track. For example, the pre-defined tracks and their corresponding scale parts used with the tachymeter device are racing tracks for cars and the tachymeter device is used to measure the average speed of cars on the different pre-defined tracks. In this case the speed indication units on the scale part for the pre-defined racing track can range from an average speed of a slowest car on a wet racing day on said track to the average speed of a fastest car on a dry racing day on said track. Additionally, it is preferred that the scale part indicates a record speed for said pre-defined track that has been achieved by the moving object, like the car. This way the performance of the moving object can easily be compared the past speed results by such a moving object. Optionally, the scale part also indicates a slowest speed of a moving object for said pre-defined track.

Preferably, the distancing of the speed indication units on the scale part is selected such that the scale covers only one row of indication units to keep the scale uncluttered and easy to read.

In a further embodiment of the tachymeter device according to the present invention the scale parts of the set of scale parts are designed as a circular bezel of a wristwatch, wherein speed indication units on the bezel for indicating speed ranges are displayed on a circular surface of the bezel.

A bezel representing a particular scale part can be attached to the housing of the wristwatch, which serves as the housing of the tachymeter device.

A distance between speed indication units on each of the bezels is adapted to the range of typical average speeds for a pre-defined track such that the speed indication units may cover only a portion of a circular surface of a bezel or the whole surface. In an advantageous embodiment of the tachymeter device the speed indication units of a scale part form cover only half or less of the circular surface of the bezel, for example they cover about one third of the circular surface. For example, the scale is only arranged in the lower part of a watch when the bezel is attached to the watch. This way individual scales for different parameters provided by the watch, for example the time, the date, seconds and the average speed, are located in different areas on the watch. A user can quickly and reliably read the values of the different parameters and in particular can easily identify the average speed measured by the tachymeter device.

In a further embodiment of the tachymeter device according to the present invention each of the scale parts of the set of scale parts corresponds to a loop track, wherein a length of the loop track defines the pre-defined distance for said scale part for said loop track. The starting mark is defined as a location on the loop track represented by the corresponding scale part. For example, the starting mark can be defined as the position of a person standing at the loop track and watching the moving object. A stopping mark for stopping the timer corresponds to the starting mark after the moving object has covered one lap on the loop track. Therefore, the stopping mark is also indicated by the position of the person standing at the loop track and watching the moving object after it passed one lap on the loop track. With such a scale part the average speed of successive laps of the moving object on the loop track can easily be determined and the different average speed values can be compared.

In still a further embodiment of the tachymeter device according to the present invention an attachment for releasably attaching a scale part to the housing is realized by a first mounting section on the housing and a second mounting section on the scale part, wherein the first mounting section and the second mounting section engage in a form fit or a friction fit when the scale part is attached to the housing. For example, a form fit of the mounting sections can be realized by a clip connection, wherein edges of the two mounting sections flexibly engage with each other. Further, the form fit can be realized by a screw connection or a bayonet connection between the mounting sections. A friction fit can be realized for example by a press fit creating friction forces between the mounting sections that keep the sections engaged.

In a preferred embodiment of the tachymeter device of the present invention the set of scale parts includes a number of individual scale parts, that corresponds to the number of pre-defined racing tracks establishing a racing series for a type of moving objects over one year. For example, the set of scale parts includes scale parts for each of the race tracks of a Formula 1 racing series for race cars in a given year. A user of the tachymeter device who is attending several of the races of the Formula 1 series can easily modify the tachymeter device to the pre-defined track length of a specific race of the series by choosing and attaching the scale part corresponding to the pre-defined race track at the housing of the device. For example, the set of scale parts may include individualized scale parts for the Grand Prix series in Monaco, Britain, Belgium, Brazils, Denmark, etc. The set of scale parts will provide a specific scale part for each of the 23 Grand Prix races, which may be differ in the pre-determined track length, the average lowest and highest speed indications, and the lap record indication.

The user can simply watch the race from a gallery or platform at the race course and determine the average speed for each lap of the racing track by activating the timer. The average speed for each lap, for a series of laps or for the whole race can be determined by the tachymeter device.

In a further aspect the present invention refers to a wristwatch comprising a tachymeter device as described above. The wristwatch at least comprises a housing, a watch face with a preferably round shape, a time scale for the time of the day, and fingers to indicate the time on the time scale. Elements of the tachymeter device can be realized as integral parts of the wristwatch, except the scale parts that are attached to the watch housing. For example the pointer for indicating the average speed on the scale part can be an additional finger of the wristwatch and move around a center axis of the wristwatch just like the fingers of the watch. Further, the wristwatch may comprise a timer and an activator for the timer which can be used as the timer and activator of the tachymeter device.

The wristwatch according to the present invention can be easily adjusted for the use of determining the average speed of moving objects on tracks of different pre-defined distances by simply exchanging the scale parts. The measured speed is clearly indicated in a well-defined area on the watch and does not interfere with other indications, like for example the time indication.

Figure 2A:
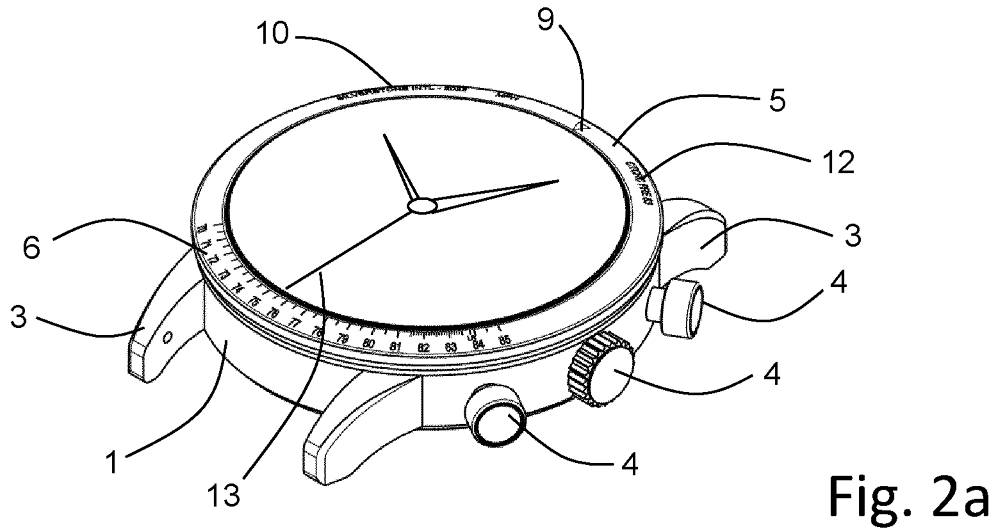
Figure 2B:
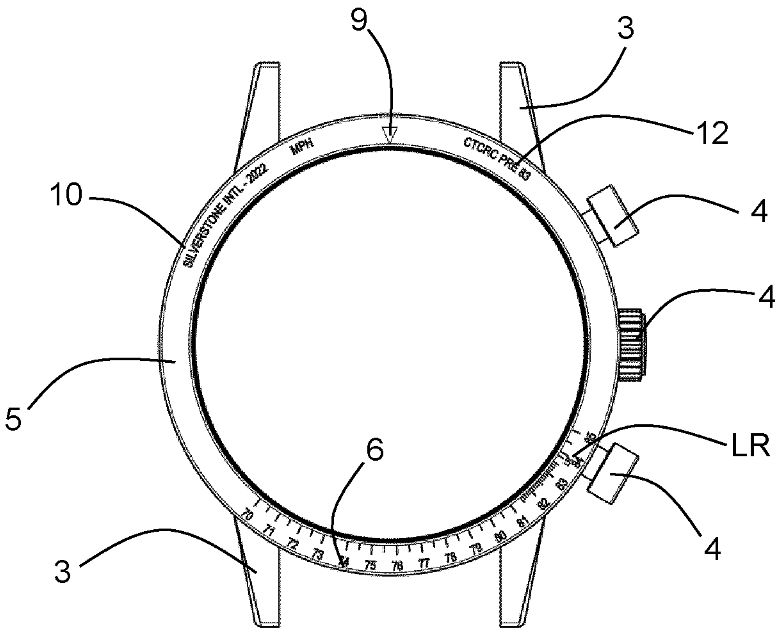
Figure 3:
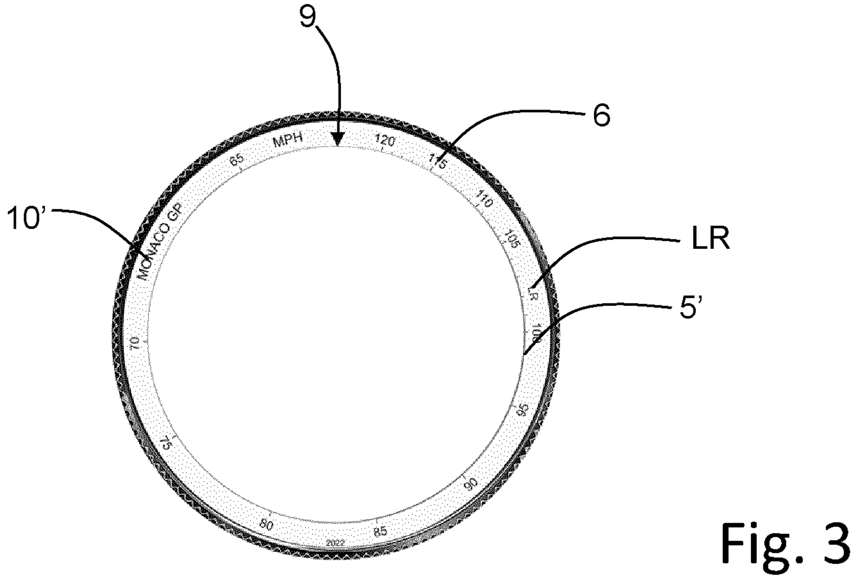
Figure 4:
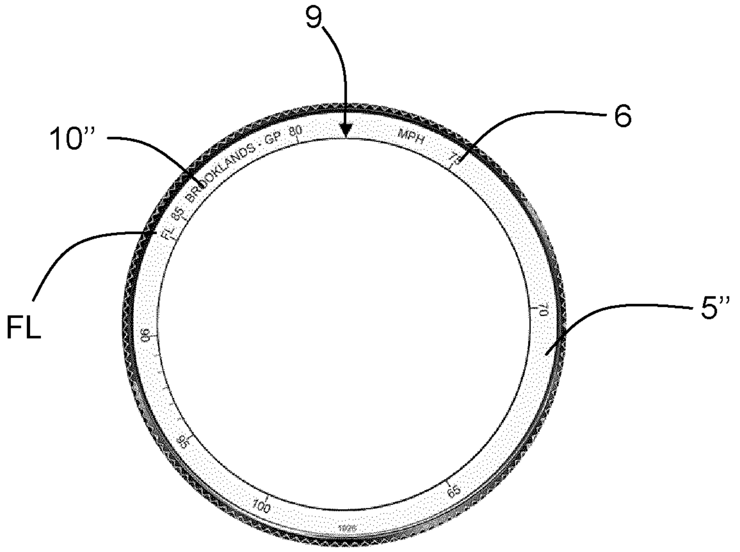

Several exemplary embodiments of the invention will be illustrated in the following drawings, which merely serve for explanation and should not be construed as being restrictive. The features of the invention becoming obvious from the drawings should be considered to be part of the disclosure of the invention both on their own and in any combination. The drawings show:

FIG. 1: a 3-dimensional, exploded view of a tachymeter device with a first scale part according to the present invention;

FIG. 2*a*: a 3-dimensional view of the tachymeter device of FIG. 1 in an assembled manner;

FIG. 2*b*: a top view of the tachymeter device of FIG. 1 in an assembled manner;

FIG. 3: a top view on a second scale part of the tachymeter device of FIG. 1; and FIG. 4: a top view on a third scale part of the tachymeter device of FIG. 1.

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures.

FIG. 1 shows a tachymeter device for indicating an average speed of a moving object according to the invention that is used in combination with a wristwatch. The wristwatch comprises a housing, which also serves as a housing 1 of the tachymeter device. The housing 1 essentially comprises a circular flat shape, wherein a surface 2 of the flat shape can be used as an area for a watch face for a time scale and fingers indicating the time on the time scale (not shown). The fingers may rotate around a center axis of the watch face as commonly known. Alternatively, the flat shape may comprise a display for digital time indication. The housing 1 comprises two pairs of extensions 3, wherein the pairs are arranged on opposing sides of the housing. The extension pairs serve as attachments for a wristband.

The tachymeter device further comprises a timer and an activator 4 for manually starting and stopping the timer. While there are three activators 4 indicated in the figures. Any of these activators can be selected as being the activator for the time, while the other activators may serve for other functionalities of the watch. The timer can be an integral unit of the wristwatch or can be used solely for determining the average speed by the tachymeter device. A scale part 5 comprises a scale 6 with speed indication units for indicating an average speed of the moving object. A pointer 13 for indicating a measured average speed on the scale 6 is arranged on the surface 2 of the watch face. The pointer is preferably arranged to rotate around the center axis of the watch face just like the fingers of the wristwatch.

The scale part 5 can be detached from the housing 1 as shown in FIG. 1. The scale part is selected from a set of scales parts (not shown) comprising a plurality of differing scale parts. Each of the scale parts has a scale with speed indication units for indicating speed ranges corresponding to differing pre-defined distances. The pre-defined distance serves as the basis for customizing each of the scale parts to specific features of a track or race course comprising a pre-defined length. For example, different scale parts may differ in the scale range for average speed indications for a given track or course length, or for different surface or weather conditions for a given track or course length or for different race series.

The scale part 5 has a circular ring-like form and serves as a bezel of the wristwatch. The scale 6 is located on the upper surface of the scale part 5, while the scale part 5 is attached with the opposite lower surface to the wristwatch. The scale part 5 is detachably mounted to the housing 1 by a first mounting section 7 on the housing 1 and a second mounting section 8 on the scale part 5. The first mounting section 7 has the form of a lip extending radially from the circumference of the housing 1. The lip stretches over a little less than a quarter of the housing circumference. The first mounting section 7 includes two of such lips that extend from the housing on opposing sides. The second mounting section 8 has the form of a lip that extends radially from an inner circumferential wall of the scale part 5. The first mounting section 7 includes two of such lips that extend on opposing sides from the circumferential wall. These lips stretch over a little less than a quarter of the circumferential wall. For attaching the scale part 5 to the housing 1, it is positioned on the housing 1 such that the lips of the second mounting section 8 are aligned with the lip-free areas of the circumference of the housing 1. Thus, when the scale part 5 is put on the surface 2 of the housing 1, the lips of the second mounting section 8 can pass the lips of the first mounting section 7 and slide down along the housing circumference until the scale part 5 rests on the surface 2 of the housing 1. In this position the lips of the second mounting section 8 are located further away than the lips of the first mounting section 7 with respect to the surface 2. Next, the scale part 5 is turned relative to the housing 1 and the lips of the second mounting section 8 slide beneath the lips of the first mounting section 7. In this position the scale part 5 cannot be lifted up anymore from the housing 1 because the lips of the second mounting section 8 engage with the lips of the first mounting section 7. The scale part 5 is rotated on the housing 1 until protrusions (not shown) on the scale part 5 snap into recesses 11 at the housing.

Thus, the scale part 5 is securely attached to the housing 1 in a form fit. This position defines the correct attachment position of the scale part 5 on the housing 1 for indicating the average speed of a moving object on the scale 6. A locator sign 9 on the scale part 5 is aligned with a control sign (not shown) on the watch face, like the 12 o'clock digit of the watch face. This alignment helps to guarantee the correct positioning of the scale part 5 on the housing 1. To detach the scale part 5 from the housing 1 it can be turned on the housing to overcome the snap fit until the lips of the second mounting section 8 are aligned with the lip-free areas of the circumference of the housing 1. In this position the scale part 5 can be lifted up from the housing 1.

FIGS. 2*a* and 2*b* show the tachymeter device in an assembled state, wherein the scale part 5 is mounted on the housing 1. FIG. 2*a* is a three-dimensional view and FIG. 2*b* is a top view. As can be seen, the scale part 5 is realized as a bezel of the wristwatch.

The scale part 5 is customized for a pre-defined distance to be covered by a moving object, wherein in this embodiment of the scale part 5 the pre-defined distance corresponds to the Silverstone International Circuit in the year 2022, as indicated on the scale part 5 in the upper left area in FIG. 2*b*, which displays the name 10 of the scale part 5. Therefore, the pre-defined distance is characterized by a loop track of 3,809 km, corresponding to approximately 2,366 miles. The scale part 5 is also customized in this embodiment for moving objects that are historic saloon cars in the CTCRC Pre-83 class. FIG. 2*b* displays the name 12 on the scale part 5 in the upper right area.

The scale 6 on the Silverstone International Circuit scale part 5 covers a range of average speed indications starting from 70 miles per hour (mph) up to 85 mph, which covers the typical average speed results for this loop track that were achieved in the past, starting from the lowest average speed on a dry surface day up to the highest average speed on a dry surface day. Further, the scale 6 includes an indication LR for a lap record for the CTCRC Pre-83 class at Silverstone International Circuit, which is currently at 83.8 mph. In this example, the speed indication units for indicating the speed range correspond to the lowest and highest average speed results on this race course and extends a small portion below the lowest and above the highest average speed. A small portion means for example about 1-10%, preferably about 1-5%, of the lowest and/or the highest average speed results. For example, if the lap record is 83.8 mph, the scale indications would range up to around 85 mph. The distance between speed indication units on each of the scale parts is adapted to the range of typical average speeds for this pre-defined race track such that the scale 6 covers only a portion of the circular surface of the scale part 5. In this embodiment the scale 6 covers only about one third of the circular surface and shows speed indications to 0.1 mph.

The scale is arranged in the lower half of the scale part 5 and the surface 2 of the wristwatch, respectively. This way the remaining surface of the scale part 5 is free and can be used for other information like the name 10 of the race track and the racing series 12. The overall design of the watch face is clean and not cluttered by intertwined watch scales for different parameters.

In use the starting mark is defined by the location of a user of the tachymeter device along the Silverstone International Circuit, more specific it can be defined as a fixed point in front of the user. Once the race car of interest passes the user or the fixed point, the user activates the timer. Once the race car passes the user or the fixed point again after one lap on the race course again, the user stops the timer. The pointer indicates the average speed for the just completed lap, wherein the average speed is derived from the pre-defined distance and the time to cover said distance measured by the timer. The stopping mark for stopping the timer corresponds to the starting mark after the moving object has covered one lap of the race course. The user can easily see if the race car is in the lower or higher range of average speed results and can identify if the average speed is close to the lap record or even higher.

The Silverstone International Circuit scale part 5 described above is just one scale part of a set of scale parts according to the invention. Other scale parts of the set of scale parts may be customized for other race tracks that are longer or shorter than the Silverstone International Circuit. The scale on the scale part for a particular race track is customized by selecting the scale range and the indication for the loop record. Other race tracks and race series may include but are not limited to the following circuits, which are the 23 circuits of the formula 1:

| Circuit | Circuit Length [miles] | Circuit Length [km] | Lap Record [mph] |
|---|---|---|---|
| Red Bull Ring, Speilberg | 2.684 | 4.318 | 66.957 |
| Autodromo Jose Carlos Pace, Interlagos | 2.678 | 4.309 | 70.54 |
| Circuit Zandvoort, Zandvoort | 2.647 | 4.259 | 71.097 |
| Circuit Gilles-Villeneuve, Montreal | 2.710 | 4.361 | 73.078 |
| Circuit de Monte Carlo, Monaco | 2.074 | 3.337 | 74.26 |
| Autodromo Enzo e Dino Ferrari, Imola | 3.051 | 4.909 | 75.484 |
| Circuit de Barcelona-Catalunya, Barcelona | 2.893 | 4.655 | 78.441 |
| Autodromo Hermanos Rodriguez, Mexico City | 2.675 | 4.304 | 78.741 |
| Autodromo Nazionale Monza, Monza | 3.600 | 5.793 | 81.046 |
| Circuit Paul Ricard, Le Castellet | 3.605 | 5.8 | 82.74 |
| Albert Park Circuit, Melbourne | 3.296 | 5.303 | 84.125 |
| Sochi Autodrom, Sochi | 3.635 | 5.848 | 85.761 |
| Miami International Autodrome, Miami Gardens | 3.362 | 5.41 | 87 |
| Hungaroring, Budapest | 2.723 | 4.381 | 87.103 |
| Silverstone Circuit, Towcester | 3.661 | 5.891 | 87.369 |
| Jeddah Corniche Circuit, Jeddah | 3.838 | 6.175 | 90.734 |
| Suzuka Circuit | 3.732 | 6.004 | 90.983 |
| Bahrain International Circuit, Sakhir | 3.364 | 5.412 | 91.447 |
| Circuit of the Americas, Austin | 3.4 | 5.472 | 96.161 |
| Yas Marina Circuit | 3.452 | 5.554 | 99.283 |
| Marina Bay Circuit, Singapore | 3.147 | 5.063 | 101.905 |
| Baku City Circuit, Baku | 3.731 | 6.003 | 103.009 |
| Circuit Spa-Francorchamps, Stavelot | 4.353 | 7.004 | 105.1 |

FIG. 3 shows another embodiment of a scale part 5' for the tachymeter device of the present invention. This scale part is customized for the pre-defined distance of the Monaco Grand Prix loop track, as indicated by the name 10'. The Monaco Circuit is 3,337 km, respectively 2,074 miles, long. The speed indication units for indicating the speed range cover the lowest and highest average speed results on this race course and extend from 65 mph to 120 mph. The lap record LR is 102 mph. A scale with divisions of 0.1 mph may be used but divisions on the FIG. 3 example are kept to a minimum for clarity. The speed indication units are not equi-distanced. The distance between units of five increments in the lower speed range is higher than in the upper speed range. It is noted, that the scale starts from the locator sign 9 and extends counter clock-wise from the lowest speed indication to the highest speed indication. The indications on the lower half of the bezel are inverted with respect to the indications on the upper half of the bezel. This is to show that the bezel is in a fixed position on the housing and does not need to be rotated like bezels in prior art wristwatches. The bezel has a knurled edge for a good grip when the bezel needs to be attached or detached from the housing.

FIG. 4 shows another embodiment of a scale part 5" for the tachymeter device of the present invention. This scale part is customized for the pre-defined distance of the Brookland Grand Prix loop track, as indicated by the name 10". The Brookland Circuit is 4.21 km, respectively 2.61 miles, long. The speed indication units for indicating the speed range cover the lowest and highest average speed results on this particular race course and extend from 65 mph to 100 mph. There is a marker FL in the embodiment of FIG. 4 which stands for fastest lap. The speed indication units of this embodiment extend over nearly the full circle on the bezel. The scale extends counter clock-wise from the lowest speed indication to the highest speed indication. Again, the indications on the lower half of the bezel are inverted with respect to the indications on the upper half of the bezel and the bezel has a knurled edge.

In summary, the tachymeter device according to the present invention is intuitive, easy to handle and also decorative. The design of each scale part takes into consideration the length of the track, the type of racing, the speed of the moving object for a particular series and dry or wet conditions. It covers the slowest and fastest moving objects plus indicates the current lap record. In a preferred embodiment the tachymeter device is a circuit tachymeter, wherein the set of scale parts is designed for varying circuits of race courses of a racing season for racing cars. More than 95% of watch owners know how to use a timer function on a wristwatch. All that is required is to fit the correct bezel for the pre-defined distance, like a race circuit, to the housing.

In the following claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. Any reference signs in the claims should not be construed as limiting the scope.

REFERENCE NUMBERS

1 housing
2 surface
3 extension pair
4 activator
5, 5', 5" scale part
6 scale
7 first mounting section
8 second mounting section
9 locator sign
10, 10', 10" name
11 snap recesses
12 race series
13 pointer
LR lap record
FL fastest lap

The invention claimed is:

1. A tachymeter device for indicating an average speed of a moving object comprising:

a timer and an activator for manually starting the timer, when the object passes a starting mark and stopping the timer, when the object passes a defined distance from the starting mark, a housing;

a scale on the housing for indicating an average speed of the moving object; and a pointer for indicating a measured average speed on the scale, wherein the measured average speed is derived from said defined distance and a time to cover said defined distance measured by the timer, wherein the scale is designed as a scale part that is arranged detachably at the housing, and wherein the scale part is selected from a set of scales parts comprising a plurality of differing scale parts each having a scale with speed indication units for indicating speed ranges corresponding to differing pre-defined distances.

2. The tachymeter device according to claim 1, wherein each of the scale parts of the set of scale parts corresponds to a track defining a different pre-defined distance for each of the different scale parts, and wherein the speed indication units on a scale part for a pre-defined track cover a range of typical average speeds of moving objects for said pre-defined track.

3. A wristwatch comprising the tachymeter device according to claim 2.

4. The tachymeter device according to claim 2, wherein the scale parts of the set of scale parts are designed as a circular bezel of a wristwatch having speed indication units for indicating speed ranges displayed on a circular surface of the bezel.

5. The tachymeter device according to claim 2, wherein the speed indication units on the scale part for said pre-defined track range from an average speed of a slowest moving object on said track to the average speed of a fastest moving object on said track.

6. The tachymeter device according to claim 5, wherein the scale parts of the set of scale parts are designed as a circular bezel of a wristwatch having speed indication units for indicating speed ranges displayed on a circular surface of the bezel.

7. A wristwatch comprising the tachymeter device according to claim 5.

8. The tachymeter device according to claim 5, wherein a distance between speed indication units on each of the scale parts is adapted to the range of typical average speeds for the pre-defined track, and wherein the speed indication units cover only a portion of a circular surface of a bezel, only half or less of the circular surface.

9. A wristwatch comprising the tachymeter device according to claim 8.

10. A wristwatch comprising the tachymeter device according to claim 1.

11. The tachymeter device according to claim 1, wherein the scale parts of the set of scale parts are designed as a circular bezel of a wristwatch having speed indication units for indicating speed ranges displayed on a circular surface of the bezel.

12. A wristwatch comprising the tachymeter device according to claim 11.

13. The tachymeter device according to claim 1, wherein each of the scale parts of the set of scale parts corresponds to a loop track, wherein a length of the loop track defines the pre-defined distance for the corresponding scale part for said loop track, and wherein the starting mark is defined as a predefined location on the loop track of a scale part and a stopping mark for stopping the timer corresponds to the starting mark after the moving object has covered one lap on the loop track.

14. A wristwatch comprising the tachymeter device according to claim 13.

15. The tachymeter device according to claim 1, wherein the speed indication units of a scale part for a track having a pre-defined distance includes an indication for a track record or a lap record for said track and/or a fastest lap for said track.

16. A wristwatch comprising the tachymeter device according to claim 15.

17. The tachymeter device according to claim 1, wherein an attachment for releasably attaching a scale part to the housing is realized by a first mounting section on the housing and a second mounting section on the scale part, wherein the first mounting section and the second mounting section engage in a form fit or a friction fit when the scale part is attached to the housing.

18. A wristwatch comprising the tachymeter device according to claim 17.

19. The tachymeter device according to claim 1, wherein the set of scale parts includes a number of individual scale parts, that correspond to the number of pre-defined racing tracks establishing a racing series for a type of moving object over one year.

20. A wristwatch comprising the tachymeter device according to claim 19.

* * * * *